W. E. ANDERSON.
VEHICLE TIRE.
APPLICATION FILED OCT. 14, 1911.
1,064,119.
Patented June 10, 1913.
2 SHEETS—SHEET 1.
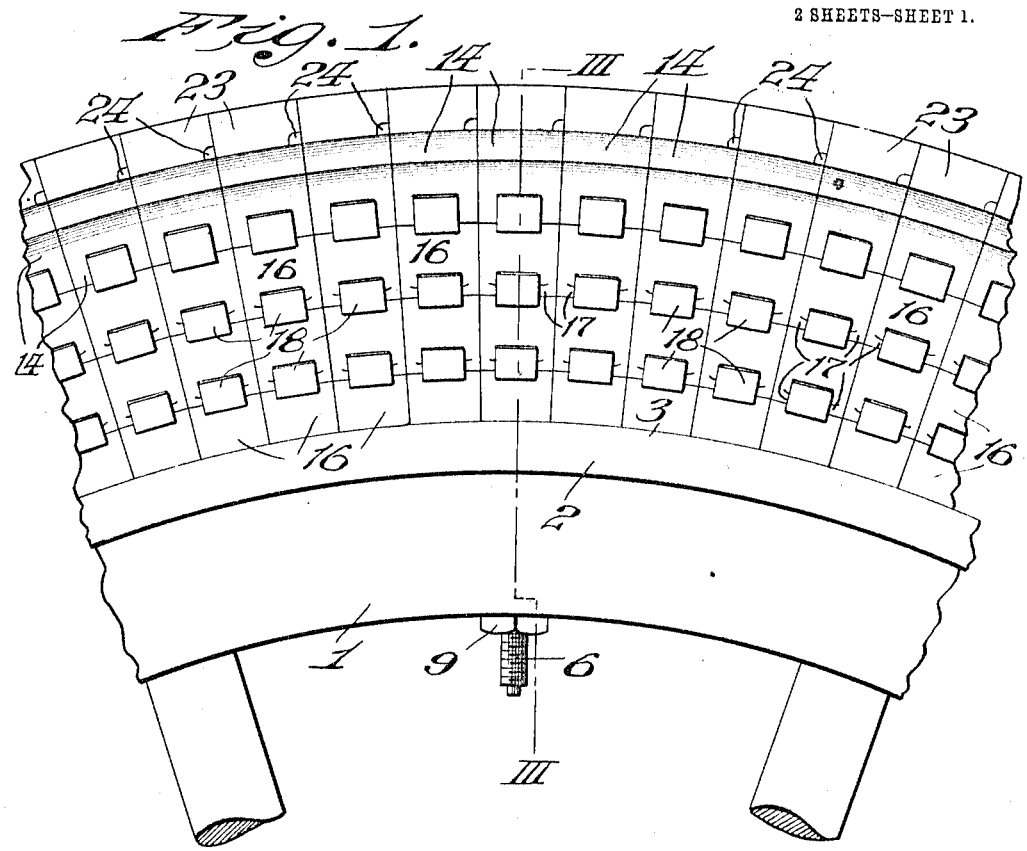
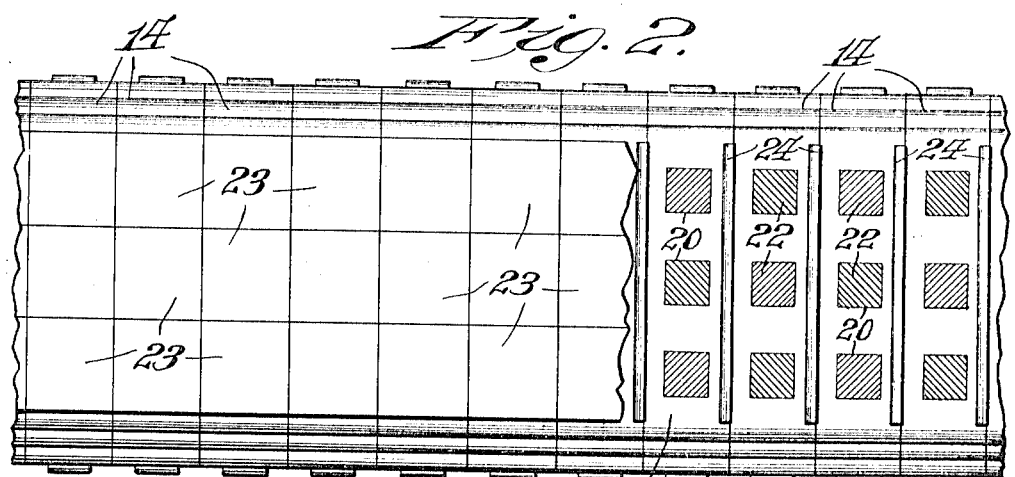
Inventor:
William E. Anderson W. E. ANDERSON.
VEHICLE TIRE.
APPLICATION FILED OCT. 14, 1911.
1,064,119.
Patented June 10, 1913.
2 SHEETS—SHEET 2.
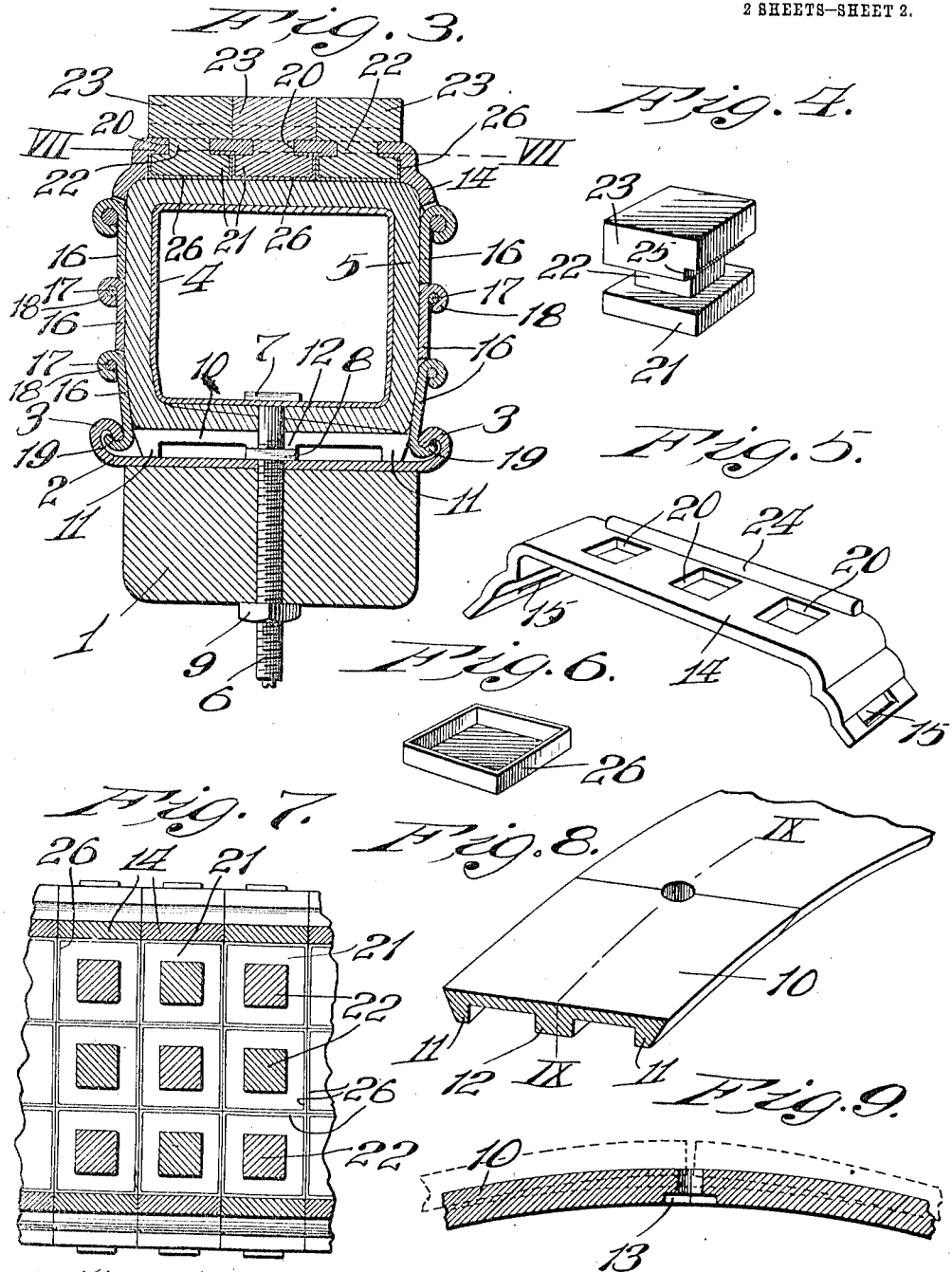

UNITED STATES PATENT OFFICE.

WILLIAM E. ANDERSON, OF ST. LOUIS, MISSOURI.

VEHICLE-TIRE.

1,064,119.     Specification of Letters Patent.    Patented June 10, 1913.

Application filed October 14, 1911. Serial No. 654,650.

*To all whom it may concern:*

Be it known that I, WILLIAM E. ANDERSON, a citizen of the United States of America, residing in the city of St. Louis and State of Missouri, have invented certain new and useful Improvements in Vehicle-Tires, of which the following is a specification.

This invention relates to pneumatic tires, and has for its primary object to provide an improved construction, combination and arrangement of parts in devices of this character whereby they may be simply, and economically constructed and rendered durable and efficient in service.

More specifically, one of the objects of this invention is to provide an improved pneumatic tire construction which will be absolutely puncture proof.

Another object is to provide improved means for mounting the tire upon the rim of the wheel.

Another object is to provide an improved tire tread constructed of removable portions, said portions being provided with means for rendering them puncture-proof.

Other and further objects will appear in the specification and be specifically pointed out in the appended claims, reference being had to the accompanying drawings exemplifying the invention, and in which, Figure 1 is a side elevation of a portion of a wheel provided with my improved tire. Fig. 2 is a plan view of the same, parts being shown in section. Fig. 3 is a section on the line III—III, Fig. 1. Fig. 4 is a perspective view of one of the tread portions of the tire. Fig. 5 is a perspective view of one of my improved tread supports. Fig. 6 is a perspective view of a tread socket detached. Fig. 7 is a section on the line VII—VII, Fig. 3. Fig. 8 is a fragmentary perspective of the rim tire seat band, parts being shown in section. Fig. 9 is a section on the line IX—IX, Fig. 8.

Referring more particularly to the drawings which represent the adaptation of my invention to an automobile wheel, the felly 1 of said wheel is provided with a rim band 2, the lateral edges of which are formed into hook shaped flanges 3. The tire proper comprises an outer shell of peculiar construction to be hereinafter described, an inner pneumatic tube 4, and an intermediate cushion 5 of any suitable relatively inexpensive material, such as canvas or the like.

A valve tube 6, with its flanged head 7 within the inner tube 4, extends inwardly through the felly 1 of the wheel, and is threaded exteriorly for the reception of the threaded washer 8 which bears upon the outer periphery of the rim 2, and for the reception of the nut 9 which retains the valve tube 6 in position. One or more of the valve tubes 6 may be used, as desired.

Extending around the rim band 2 is an interlocking bridging strap 10 provided with lateral flanges 11 and a central flange 12, said lateral flanges, when the parts are assembled, being in abutment against the rim band 2, and the central flange being recessed at 13 (see Fig. 9) for the reception of a threaded washer. The interlining cushion 5 is preferably formed with wedge-shaped overlapping edges, as shown in Fig. 3, adapting them to be drawn snugly together between the bridging strap 10 and the inner tube 4 when inflated.

Referring more especially to Figs. 1, 2, 3, 5 and 7, the composite tread embodied in my improved tire comprises a plurality of transversely arranged tread supports or straps 14 provided with apertures 15 at each end, adapting them to be articulately connected with the hooked flanges 3 of the rim band 2 by means of imperforate metallic shields, each comprising a series of metallic plates 16 which are articulately connected together to provide a substantially continuous curved surface by having integrally formed portions 17 offset to provide pintles about which the bearing lugs 18 of adjoining sections are bent to form hinges. The sections nearest the rim band 2 are provided with hook shaped flanges 19 which are interlocked with the flanges 3 of the band 2 when the interlocking bridging strap 10 is drawn down into the position shown in Fig. 3.

As shown best in Fig. 5, the flat portion of the strap 14 is provided with a series of rectangular openings 20 for the reception of resilient tread units, each of which comprises an inner locking flange 21, a neck 22 fitting the aperture 20, and an outer head 23. When the parts are assembled in running order, the heads 23 fit snugly together around the periphery of the tire to provide a continuous solid rubber tread surface, as shown in Figs. 1 and 2.

Extending along the rear edge of each of the straps 14, is an elongated rib or lug 24 which forms an abutment for resisting the rearward displacement of the tread units when the wheel is in motion. For this purpose, each of the tread units is recessed at 25 to adapt them to overhang the rib 24 and lie in contact with the tread units of the next succeeding strap 14. Incasing the locking flange 21 of each of the tread units, is a box socket 26 within which said flanges are seated, these sockets forming a substantially continuous metallic shield throughout the tread of the tire. It will be seen that the shields comprising the articulated sections 16, the metallic box sockets 26, and the straps 14, constitute a complete metal casing which is substantially inpenetrable.

As represented in Figs. 3, 8 and 9, the interlocking bridging band 10 is parted transversely at the valve tube 6. When it is desired to remove or dismantle the tire the nut 9 is removed and the tube 6 forced outwardly to raise the adjoining ends of the bridging strap 10 into the position shown in dotted lines in Fig. 9, in which position the lateral edges of said bridge are moved out of abutment with the innermost sections 16 which are hooked to the flanges 3 of the rim 2. The outer shell is then readily removed.

Obviously, various modifications in the details of the embodiment of my invention, as described herein, can be made without departing from the broad spirit of my invention.

What I claim is:

1. A pneumatic tire provided with laterally abutting straps extending around the periphery of said tire, said straps having apertures therein, resilient tread units mounted in said apertures and provided with flanges on both sides of said straps, the outside flanges being in close abutment throughout the periphery of the wheel, and metallic sockets incasing the inner flanges, said sockets being in abutment throughout the periphery of the wheel, and in interlocking abutment with shoulders formed on said straps to support said inner flanges.

2. A pneumatic tire provided with an impenetrable tread comprising a plurality of straps arranged in lateral abutment throughout the periphery of the tire and provided with apertures, each of said straps being provided with a raised lug along its rear edge, and resilient tread units mounted in said apertures and provided with recesses fitting said lugs, said tread units being thereby supported against peripheral displacement.

3. A pneumatic tire provided with an impenetrable tread comprising a plurality of metallic sockets mounted on and closely arranged transversely around the outer periphery of said tire, a plurality of straps arranged transversely of said tire adjacent said metallic sockets, the side edges of said straps abutting each other, openings formed in said straps, said openings being adjacent a like number of metallic sockets, a plurality of resilient tread units mounted in said openings, each of said tread units having an inner and an outer head, said inner heads being seated in said metallic sockets, said outer heads resting on the periphery of said straps forming a tread, and said inner heads forming locking flanges.

4. A pneumatic tire provided with an impenetrable tread comprising a plurality of straps arranged transversely of the tire, and provided with apertures, resilient tread units mounted in said apertures and provided with flanges interlocking beneath said straps, and metallic sockets incasing said flanges and interlocking with said straps, said sockets being in abutment transversely and longitudinally of the tire to provide an impenetrable shield.

WILLIAM E. ANDERSON.

In the presence of—
M. C. HAMMON,
H. G. FLETCHER.